United States Patent [19]

Mori

[11] Patent Number: 4,626,365

[45] Date of Patent: Dec. 2, 1986

[54] POLYTETRAFLUORETHYLENE-CONTAINING COATING COMPOSITION FOR SLIDING PARTS

[75] Inventor: Sanae Mori, Nagoya, Japan

[73] Assignee: Daido Metal Company Ltd., Nagoya, Japan

[21] Appl. No.: 737,431

[22] Filed: May 24, 1985

[30] Foreign Application Priority Data

Jun. 5, 1984 [JP] Japan ................. 59-113949

[51] Int. Cl.$^4$ .................................. C10M 131/04
[52] U.S. Cl. ........................ 252/12; 252/12.2; 252/12.4; 252/12.6; 252/25
[58] Field of Search ............ 252/12, 12.2, 12.4, 252/12.6, 25

[56] References Cited

U.S. PATENT DOCUMENTS

| | | |
|---|---|---|
| 2,824,060 | 2/1958 | White. |
| 3,376,183 | 4/1968 | Flynn et al. |
| 3,531,432 | 9/1970 | Graver ................. 252/12 |
| 3,838,048 | 9/1974 | Hedge et al. ............ 252/12 |
| 4,000,982 | 1/1977 | Ueda. |
| 4,312,772 | 1/1982 | Mori. |
| 4,394,275 | 7/1983 | Bickle et al. |

FOREIGN PATENT DOCUMENTS 190549 10/1982 Japan.

*Primary Examiner*—Jacqueline V. Howard
*Attorney, Agent, or Firm*—Browdy and Neimark

[57] ABSTRACT

A composition for sliding parts, comprising 0.1 to 50 vol % in total of at least one selected from the group (A) consisting of FEP, PFA, ETFE, PVDF, PCTFE and EPE; 0.1 to 35 vol % of compound metal oxide; and the balance PTFE, the total content of components other than PTFE ranging between 0.2 and 70 vol %. Such composition may further contain at least one of metal oxide, metallic lubricant, metal sulfide, metal fluoride, carbonic solid lubricant, fibrous material, ceramics.

9 Claims, No Drawings

POLYTETRAFLUORETHYLENE-CONTAINING COATING COMPOSITION FOR SLIDING PARTS

BACKGROUND OF THE INVENTION

The present invention relates to a compsotion suitable for use as a material of sliding parts of a single substance or of a composite layer type and having low friction property, excellent wear resisting property and superior load capacity.

Compositions suitable for the material of sliding parts are disclosed in the following literatures:
(1) U.S. Pat. No. 2,995,462
(2) U.S. Pat. No. 4,312,772
(3) U.S. Pat. No. 4,439,484
(4) U.S. Pat. No. 4,208,472
(5) Japanese Patent Application No. 211277/1982 (corresponding to U.S. patent application Ser. No. 554,472 filed on Nov. 22, 1983, abandoned and the continuation application thereof, Ser. No. 790,760.)

The compositions disclosed in these literatures, however, are not always satisfactory in the aspect of low friction property, wear resistance and load capacity all of which are very important factors or requisites for sliding parts.

SUMMARY OF THE INVENTION

Accordingly, an object of the invention is to provide a composition for sliding parts having low friction property, higher wear resistance and load capacity than those of the material disclosed in the literatures mentioned above.

To this end, according to the invention, there is provided a composition for sliding parts selected from the following four kinds (a) to (d):

(a) a composition for sliding parts consisting of:
0.1 to 50 vol % in total of at least one selected from the group (A) consisting of tetrafluoroethylenehexafluoropropylene copolymer resin (FEP), tetrafluoroethylene-perfluoroalkylvinyl ether copolymer resin (PFA), tetrafluoroethylene-ethylene copolymer resin (ETFE), vinylidene fluoride resin polymer (PVDF), chlorotrifluoroethylene resin (PCTFE), fluoroethylene propylene ether resin (EPE);
0.1 to 35 vol % of a compound metal oxide; and
the balance substantially polytetrafluoroethylene (PTFE), the total content of components other than PTFE ranging between 0.2 and 70 vol %;

(b) a composition for sliding parts consisting of:
0.1 to 50 vol % in total of at least one selected from the group (A) consisting of FEP, PFA, ETFE, PVDF, PCTFE and EPE;
a compound metal oxide;
a metal oxide;
the total content of both the compound metal oxide and the metal oxide ranging between 0.1 to 35 vol %; and
the balance substantially PTFE, the total content of components other than PTFE ranging between 0.2 and 70 vol %;

(c) a composition for sliding parts consisting of:
0.1 to 50 vol % in total of at least one selected from the group (A) consisting of FEP, PFA, ETFE, PVDF, PCTFE and EPE;
a compound metal oxide;
at least one selected from a group (B) consisting of: a metallic lubricant such as Pb, Sn and/or its alloy; a metal sulfide; a metal fluoride; a carbonic solid lubricant such as graphite fluoride, graphite, coke, carbon and etc.; a fibrous material such as carbon fiber; and ceramics such as SiC;
the total content of the compound metal oxide and the at least one selected from the group (B) ranging between 0.1 to 35 vol %; and
the balance substantially PTFE, the total content of components other than PTFE ranging between 0.2 and 70 vol %; and (d) a composition for sliding parts consisting of:
0.1 to 50 vol % in total of at least one selected from the group (A) consisting of FEP, PFA, ETFE, PVDF, PCTFE and EPE;
a compound metal oxide;
a metal oxide;
at least one selected from a group (B) consisting of: a metallic lubricant such as Pb, Sn and/or its alloy; metal sulfide; a metal fluoride; a carbonic solid lubricant such as graphite fluoride, graphite, coke, carbon and etc.; a fibrous material such as carbon fiber; and ceramics such as SiC,
the total content of the compound metal oxide, the metal oxide and the at least one selected from the group (B) ranging between 0.1 to 35 vol %; and
the balance substantially PTFE, the total content of components other than PTFE ranging between 0.2 and 70 vol %.

An explanation will be made hereinunder as to the reason why the contents of the composition for the sliding parts of the invention are determined as set forth in claim.

(1) Regarding 0.1 to 50 vol % in total of at least one selected from the group A consisting of FEP, PFA, ETFE, PVDF, PCTFE and EPE:

The wear resistant property and the load capacity are extremely low when the content of this constituent is below 0.1 vol %. On the other hand, when the content of this constituent exceeds 50 vol %, although the wear resistance property is improved, the friction coefficient and the friction temperature are increased undesirably to cause a deterioration in the sliding performance. For these reasons, the content of this constituent is selected to range between 0.1 and 50 vol %.

(2) Regarding 0.1 to 35 vol % of a compound metal oxide;
or 0.1 to 35 vol % in total of a compound metal oxide and a metal oxide; or
0.1 to 35 vol % in total of a compound metal oxide and at least one selected from group B; or
0.1 to 35 vol % in total of a compound metal oxide, a metal oxide and at least one selected from the group B:

The addition of these constituents does not produce any appreciable improvement in the wear resistance and load capacity when the total content falls below 0.1 vol %, whereas, when the content exceeds 35 wt %, the material becomes too brittle to be used practically.

(3) 0.2 to 70 vol % in total of components other than PTFE:

The effect of addition of these components does not become appreciable if the total content is smaller than 0.2 vol %. Conversely, when the total content of these components is increased beyond 70 vol %, the material becomes too brittle to be used practically and the multiplied effect of the components is lost to degrade the sliding property due to rise in the friction coefficient and friction temperature. For these reasons, the total content of these components is selected to range between 0.2 and 70 vol %.

The metal lubricant regarding the composition includes at least one of Pb, Sn, Cu, Zn, Sb, Bi, Cd, In, Li and/or the alloy thereof.

The metal oxide used as the constituent of the composition includes at least one oxide of Zn, Al, Sb, Y, In, Zr, Mo, Cd, Ca, Ag, Cr, Co, Ti, Si, Mn, Sn, Ce, W, Bi, Ta, Fe, Cu, Pb, Ni, Te, Nb, Pt, V, Pd, Mg and Li.

On the other hand, the compound metal oxide include at least one of $CoO-Al_2O_3$, $TiO_2-ZnO_2$, $PbO-TiO_2$, $CoO-SnO_2$, $MgO-Al_2O_3$, $ZrO_2-SiO_2$, $CoO-Al_2O_3-MgO$, $CoO-Al_2O_3-Cr_2O_3$, $CoO-ZnO-MgO$, $Pb_3O_4-Sb_2O_3-TiO_2$, $Cr_2O_3-Sb_2O_3-TiO_2$, $Cr_2O_3-CuO-MnO_2$, $CoO-Cr_2O_3-Fe_2O_3$, $CoO-ZnO_2-NiO_2-TiO_2$ and $CoO-Cr_2O_3-MnO_2-Fe_2O_3$.

The word "metallic lubricant" in this specification should be understood to generally include metals such as Pb, Sn, Sb, Bi, Cd, In, Li and/or their alloys, whereas the word "metal fluorides" is used to generally include $PbF_2$, $AlF_3$, $CdF_2$ and $BaF_2$. The fibrous materials usable as the constituent of the composition may be at least one of nautral and artificial fibers such as carbon fiber, glass fiber, cotton (cellulose), asbestos, rock wool, potassium titanate fiber, aromatic polyamide fiber and so forth. Ceramics used in the composition are SiC, TiC, TiN, $B_4C$, BN, $Si_3N_4$, AlN, HfN, TaN, WC, TaC, VC, ZrC and etc.

DESCRIPTION OF THE PREFERRED EMBODIMENTS

Embodiment 1 (Composition for Sliding Part of Single Substance Type)

Compositions for sliding parts of a single substance are produced by use of the following steps:
(a) a weighing step for weighing powders having constituents ratios shown in Table 1;
(b) a mixting step for mixing each of the powders in 2 to 10 minutes by use of a mixer;
(c) a compacting step for forming a compact of a circular rod having a diameter of 50 mm and a length of 50 mm or of a hollow circular rod (cylindrical body) having an outer diameter of 35 mm, an inner diameter of 15 mm and a length of 40 mm by use of a compression force of about 1000 kg/cm$^2$; and
(d) a sintering step for sintering the compact by holding it at a temperature of 327° C.-400° C. in several hours in an inert gas atmosphere (, for example, nitrogen gas) or in an atmospheric air after gradually heating it from a room temperature, and then effecting the furnace cooling thereof.

By using the steps of (a) to (d) there were obtained compositions Nos. 26 to 30 for a sliding part of single substance type. The test results of these compositions are shown in Table 1, the conditions of each of the wear and friction tests being shown in Table 2.

Embodiment 2 (Compositions for Sliding Parts of Composite Layer Type)

Cu-Pb alloy powder was put in a form of layer of about 0.35 mm thick on a structural low-carbon steel sheet of 1.24 mm thick having a Cu-plating layer of 5 μm thick, and was sintered at 820° C. to form a porous structure. Thereafter, the steel sheet was made to pass through a passage formed between opposing rolls such that the pores of the porous copper-lead alloy layer and the surface of the same are impregnated and coated with the compositions shown in Table 1 to a thickness of 10 to 30 μm. Then, the sheet was sintered in the atmospheric air at a temperature of 327° to 400° C. for 2 to 5 minutes and was passed through a passage between other pair of rolls such as to have a uniform overall thickness of 1.50 mm. Samples of conventional materials (sample Nos. 1 to 6) and samples of materials of the invention (sample Nos. 7 to 25) were prepared by the process explaiend above.

These samples were subjected to a wear test which was conducted under the conditions shown in Table 2. The results of the test are shown in Table 1.

The metal used as the backing metal in the material of the invention need not always be a steel. The backing metal may be plated not only with copper but also with metals other than copper or alloys or, alternatively, may be used without plating. The porous layer formed on the backing metal may be made of a copper alloy such as bronze or metals other than copper or other suitable alloy.

TABLE 1

Compositions for Sliding Part of Single Substance or Composite Layer

| | No. | PFA | FEP | ETFE | EPE | PVDF | Pb | Pb—Sn | PbF$_2$ | HoS$_2$ | CF | SiC | TiC | PbO | Al$_2$O$_3$ | Ph$_3$O$_4$ | Cr$_2$O$_3$ |
|---|---|---|---|---|---|---|---|---|---|---|---|---|---|---|---|---|---|
| Prior Art | 1 | | | | | | 20 | | | | | | | | | | |
| | 2 | | | | | | | 14 | 8 | | | | | | | | |
| | 3 | 20 | | | | | | | | | | | | | | | |
| | 4 | | 20 | | | | | | | | | | | | | | |
| | 5 | 30 | | | | | | | | 10 | | | | | | | |
| | 6 | | 0.5 | 0.5 | 0.5 | | 5 | | | | | 5 | | | | | |
| Present Invention | 7 | 5 | | | | | | | | | | | | | | | |
| | 8 | 20 | | | | | | | | | | | | | | | |
| | 9 | 20 | | | | | | | | | | | | | | | |
| | 10 | 19 | | | | | | | | | | | | | | | |
| | 11 | 20 | | | | | | | | | | | | | | | |
| | 12 | | 0.5 | 0.5 | 0.5 | | | | | | | | | | | | |
| | 13 | 45 | | | | | | | | | | | | | | | |
| | 14 | | | | | 0.5 | | | | | | | | | 10 | | |
| | 15 | 20 | | 10 | | | | | | | | | | | 0.5 | | 0.5 |
| | 16 | | 0.5 | | | | | | | | | 5 | | | | | |
| | 17 | 5 | | | 5 | | | | | | | | | | | | |
| | 18 | 40 | | | | | | 20 | | | | | | | | | |
| | 19 | 10 | 10 | | | | 5 | | | 5 | | | | | | | |
| | 20 | | | | | 0.5 | | | | | 0.5 | | | | | | |
| | 21 | 20 | 10 | | | | 5 | | 1 | | | | | | 0.5 | | |
| | 22 | 10 | | | | | | | | | | 5 | | | | 5 | |
| | 23 | | 0.5 | | | | 10 | | 10 | | | | | | | | |
| | 24 | 20 | | | | | | | | | | | | | 0.5 | | 0.5 |

TABLE 1-continued

Compositions for Sliding Part of Single Substance or Composite Layer (Continuation of columns from previous page, rows 25-30):

| No. | | | | | | |
|---|---|---|---|---|---|---|
| 25 | | 1.5 | | | 0.5 | |
| 26 | 20 | | | | | 0.5 | 0.5 |
| 27 | 20 | 10 | | | | |
| 28 | 10 | 10 | | 5 | | 5 | | 0.5 |
| 29 | 20 | 10 | 5 | | 1 | | 5 | 0.5 |
| 30 | 5 | | 5 | | | | |

| | No. | TiO₂ | CoO | PbO—TiO₂ | Pb₃O₄—Sb₂O₃—TiO₂ | Cr₂O₃—Sb₂O₃—TiO₂ | CoO—Cr₂O₃—HnO₂—Fe₂O₃ | PTFE | wear μm | Friction coefficient | Kind |
|---|---|---|---|---|---|---|---|---|---|---|---|
| Prior Art | 1 | | | | | | | ba-1. | 25.0 | 0.21 | Composite Layer |
| | 2 | | | | | | | " | 4.2 | 0.25 | |
| | 3 | | | | | | | " | 9.0 | 0.25 | |
| | 4 | | | | | | | " | 17.5 | 0.27 | |
| | 5 | | | | | | | " | 7.5 | 0.20 | |
| | 6 | | | | | | | " | 5.4 | 0.21 | |
| Present Invention | 7 | | | 5 | | | | " | 1.8 | | |
| | 8 | | | | | 2.5 | | " | 0.6 | 0.18 | |
| | 9 | | | | 1 | | | " | 0.8 | | |
| | 10 | | | | 5 | | | " | 2.0 | | |
| | 11 | | | | 0.5 | | | " | 2.9 | | |
| | 12 | | | 30 | | | | " | 3.6 | | |
| | 13 | | | | | 0.5 | | " | 2.3 | | |
| | 14 | | | 10 | | | | " | 3.6 | | |
| | 15 | | | | | 10 | 0.5 | " | 1.4 | 0.19 | |
| | 16 | 5 | | | | | | " | 3.2 | | |
| | 17 | | 10 | | | 10 | | " | 3.0 | 0.16 | |
| | 18 | | | | | 0.5 | | " | 1.9 | | |
| | 19 | | | | 10 | | | " | 2.8 | 0.16 | |
| | 20 | | | | 30 | | | " | 3.5 | | |
| | 21 | | | | | 30 | | " | 3.7 | 0.17 | |
| | 22 | | | 5 | | | 5 | " | 3.0 | | |
| | 23 | 0.5 | | 0.5 | | | 0.5 | " | 2.0 | | |
| | 24 | | | | 10 | | | " | 2.5 | | |
| | 25 | | 0.5 | | | 2 | | " | 2.2 | | |
| | 26 | | | | 1 | | | " | | 0.12 | Single Substance |
| | 27 | | | | | | 0.5 | " | | 0.13 | |
| | 28 | | | | 10 | | | " | | 0.11 | |
| | 29 | | | | | 30 | | " | | 0.12 | |
| | 30 | | 10 | 10 | | | | " | | 0.11 | |

TABLE 2

| | Conditions of Wear Test | Conditions of Friction Test |
|---|---|---|
| Testing machine | Friction-wear tester of thrust washer type | Friction-wear tester of thrust washer type |
| Size of test piece | 40 mm long, 40 mm wide and 1.5 mm thick | Single substance: 50 mm in outer diameter, 5 mm in thickness / Composite layer: 40 mm in vertical length, 40 mm in lateral length, 1.5 mm in thickness |
| Load | Accumulative load of each 40 Kg/cm² Up to maximum load of 400 Kg/cm² | 25 Kg/cm² |
| Peripheral speed | 0.5 m/sec | 0.1 m/sec |
| Test temperature | 100° C. | Room temperature |
| Test time | 30 minute at each load level | 4 hours |
| Lubricating oil | Lubricating oil for shock absorber | Dry |

The compositions embodying the present invention offer the following advantages.

As will be clearly understood from Table 1, the composition sample Nos. 7 to 25 of composite layer type sliding parts prepared in accordance with the invention show much higher wear resistance and better friction property than the conventional material sample Nos. 1 to 6 of composite layer type sliding parts, well achieving the object of the invention mentioned before.

In comparing the compositions (Nos. 9, 15, 17, 19 and 21) for sliding part of composite layer type of the present invention with the compositions (Nos. 26, 27, 28, 29 and 30) for sliding part of single substance, the single substance type was found to be better than the composite layer type. Further, in the case of the single substance type, there were obtained such features that both superior compatibility and foreign matter-burying property were obtained which are properties indispensable to obtain improved bearing characteristics and that scars are prevented from occurring in a material in contact with the sliding part composition.

The composite layer type sliding part composition of the invention can be used for various sliding parts such as a bearing in a reciprocating mechanism such as the hydraulic cylinder of an automotive shock absorber, bearings for pumps, oil-lubricated bearings and so forth. The composition of the single substance type can be used for various sliding parts such as a bearing in an office automation equipments, equipments regarding fiber and textiles, domestic electrification equipments and sounders, a piston ring of shock absorber for automobile, an oil seal, and a usual industrial machinery.

Thus, the composition for slidable parts in accordance with the invention exhibits a superior wear resistance property and, therefore, is quite advantageous from the practical and economical points of view.

What is claimed is:

1. A composition for sliding parts, selected from the group consisting of:
   (a) a composition for sliding parts consisting of:
      0.1 to 50 vol % in total of at least one selected from the group (A) consisting of tetrafluoroethylenehexafluoropropylene copolymer resin (FEP), tetrafluoroethylene-perfluoroalkylvinyl ether copolymer resin (PFA), tetrafluoroethylene-ethylene copolymer resin (ETFE), fluoroethylene propylene ether resin (EPE);
      0.1 to 35 vol % of a compound metal oxide; and
      the balance substantially polytetrafluoroethylene (PTFE), the total content of components other than PTFE ranging between 0.2 and 70 vol %;
   (b) a composition for sliding parts consisting of:
      0.1 to 50 vol % in total of at least one selected from the group (A) consisting of FEP, PFA, ETFE, and EPE;
      a compound metal oxide;
      a metal oxide;
      the total content of both the compound metal oxide and the metal oxide ranging between 0.1 to 35 vol %; and
      the balance substantially PTFE, the total content of components other than PTFE ranging between 0.2 and 70 vol %;
   (c) a composition for sliding parts consisting of:
      0.1 to 50 vol % in total of at least one selected from the group (A) consisting of FEP, PFA, ETFE, and EPE;
      a compound metal oxide;
      at least one selected from a group (B) consisting of: a metallic lubricant; a metal sulfide; a metal fluoride; a carbonic solid; a fibrous material such as carbon fiber; and ceramics
      the total content of the compound metal oxide and at least the one selected from the group (B) ranging between 0.1 to 35 vol %; and
      the balance substantially PTFE, the total content of components other than PTFE ranging between 0.2 and 70 vol %; and
   (d) a composition for sliding parts consisting of:
      0.1 to 50 vol % in total of at least one selected from the group (A) consisting of FEP, PFA, ETFE, and EPE;
      a compound metal oxide;
      a metal oxide;
      at least one selected from a group (B) consisting of: a metallic lubricant; metal sulfide; a metal fluoride; a carbonic solid lubricant; a fibrous material; and ceramics
      the total content of the compound metal oxide, the metal oxide and the at least one selected from the group B ranging between 0.1 to 35 vol %; and
      the balance substantially PTFE, the total content of components other than PTFE ranging between 0.2 and 70 vol %.

2. A composition according to claim 1, consisting of 0.45 to 40 vol % in total of at least one selected from the group consisting of FEP, PFA, ETFE, and EPE; 0.2 to 30 vol % of compound metal oxide, and the balance substantially PTFE.

3. A composition according to claim 2, wherein said compound metal oxide is at least one selected from a group consisting of $PbO\text{-}TiO_2$, $Pb_3O_4\text{-}Sb_2O_3\text{-}TiO_2$ and $Cr_2O_3\text{-}Sb_2O_3\text{-}TiO_2$.

4. A composition according to claim 1, consisting of: 0.45 to 30 vol % in total of at least one selected from the group consisting of FEP, PFA, ETFE, and EPE; 0.2 to 30 vol % in total of a metal oxide and a compound metal oxide; and the balance substantially PTFE.

5. A composition according to claim 4, wherein said compound metal oxide is at least one selected from a group consisting of $PbO\text{-}TiO_2$, $Pb_3O_4\text{-}Sb_2O_3\text{-}TiO_2$, $Cr_2O_3\text{-}Sb_2O_3\text{-}TiO_2$ and $CoO\text{-}Cr_2O_3\text{-}MnO_2\text{-}Fe_2O_3$, while said metal oxide is at least one selected from a group consisting of $PbO$, $Al_2O_3$, $Pb_3O_4$, $Cr_2O_3$, $TiO_2$ and $CoO$.

6. A composition according to claim 1, consisting of 0.45 to 40 vol % of at least one selected from the group (A) consisting of FEP, PFA, ETFE, and EPE; 0.5 to 20 vol % of at least one selected from the group (B) consisting of a metallic lubricant, a metal sulfide, a metal fluoride, a carbonic solid lubricant, a fibrous material such as carbon fiber, and ceramics; 0.2 to 30 vol % in total of compound metal oxides; and the balance substantially PTFE.

7. A composition according to claim 1, wherein said compound metal oxides is $Pb_3O_4\text{-}Sb_2O_3\text{-}TiO_2$ or $Cr_2O_3\text{-}Sb_2O_3\text{-}TiO_2$.

8. A composition according to claim 1, consisting of 0.45 to 40 vol % of at least one selected from the group A consisting of FEP, PFA, ETFE and EPE; 0.2 to 30 vol % in total of a metal oxide, a compound metal oxide and at least one selected from the group B consisting of a metallic lubricant, metal sulfide, metal fluoride, a carbonic solid lubricant, and ceramic a; and the balance substantially PTFE.

9. A composition according to claim 8, wherein said compound metal oxide is at least one selected from a group consisting of $PbO\text{-}TiO_2$, $Pb_3O_4\text{-}Sb_2O_3\text{-}TiO_2$, $Cr_2O_3\text{-}Sb_2O_3\text{-}TiO_2$ and $CoO\text{-}Cr_2O_3\text{-}MnO_2\text{-}Fe_2O_3$, while said metal oxide is at least one selected from a group consisting of $PbO$, $Al_2O_3$, $Pb_3O_4$, $Cr_2O_3$, $TiO_2$ and $CoO$.

* * * * *